(12) United States Patent
Whitlock et al.

(10) Patent No.: US 6,382,562 B1
(45) Date of Patent: May 7, 2002

(54) AFT EGRESS AND CONTROL DEVICE FOR AN AIRCRAFT

(75) Inventors: Jennifer Phillips Whitlock, Huntington Beach; Blaine K. Rawdon, San Pedro; Sean R. Wakayama, Stanton, all of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/438,090

(22) Filed: Nov. 10, 1999

(51) Int. Cl.⁷ .................................. B64D 9/00
(52) U.S. Cl. ................. 244/118.3; 244/217; 244/129.6; 244/129.5
(58) Field of Search ............................ 244/119, 117 R, 244/118.1, 118.5, 36, 118.3, 129.6, 129.5, 129.4, 217, 215, 213

(56) References Cited

U.S. PATENT DOCUMENTS

| | | | |
|---|---|---|---|
| 1,854,444 A | * | 4/1932 | Barnhart ...................... 244/217 |
| 1,916,475 A | * | 7/1933 | Hall ............................ 244/217 |
| 1,987,050 A | | 1/1935 | Burnelli |
| 2,323,279 A | | 6/1943 | Van Zelm |
| 2,376,780 A | * | 5/1945 | Kenyon ........................ 244/87 |
| 2,547,811 A | * | 4/1951 | Burnelli ....................... 244/118 |
| 2,616,639 A | * | 11/1952 | Burnelli ........................ 244/36 |
| 2,650,780 A | | 9/1953 | Northrop et al. |
| 2,759,691 A | | 8/1956 | Weaver et al. |
| 2,926,869 A | * | 3/1960 | Sullivan ....................... 244/36 |
| 2,942,813 A | | 6/1960 | English |
| 3,216,373 A | * | 11/1965 | Alter et al. .................... 244/12 |
| 3,544,046 A | | 12/1970 | Belolipetsky et al. |
| 4,140,291 A | | 2/1979 | Evans et al. |
| 4,167,258 A | | 9/1979 | Robertson |
| 4,449,679 A | | 5/1984 | McComas |
| 4,566,657 A | * | 1/1986 | Grow ........................... 244/90 |
| 4,832,286 A | | 5/1989 | Brookes |
| 5,893,535 A | | 4/1999 | Hawley |

FOREIGN PATENT DOCUMENTS

GB     1 245 432     3/1972

* cited by examiner

Primary Examiner—Galen L. Barefoot
(74) Attorney, Agent, or Firm—Alston & Bird LLP

(57) ABSTRACT

An aircraft having a cabin within a wing of the aircraft includes an access opening in an aft end of the cabin adjacent a trailing edge of the wing, and a trailing edge portion of the wing juxtaposed with the access opening and including at least one pivotable panel which is pivotable into an open position so as to form a passage in the trailing edge portion for entry therethrough and through the access opening into the cabin. The trailing edge portion in one embodiment comprises upper and lower panels which are normally in converging relation such that the passage to the access opening of the cabin is normally closed, but which are pivotable relative to each other for creating the passage. The lower panel preferably is pivotable into a generally horizontal position so that it serves as a ramp for loading and unloading persons and cargo into and from the cabin. The upper and/or lower panel in another embodiment may be pivoted during flight so as to serve as a control surface for the aircraft. The lower panel in still another embodiment is pivotable into a downwardly angled position extending down from the wing so as to serve as a slide for emergency evacuation of the cabin.

16 Claims, 4 Drawing Sheets

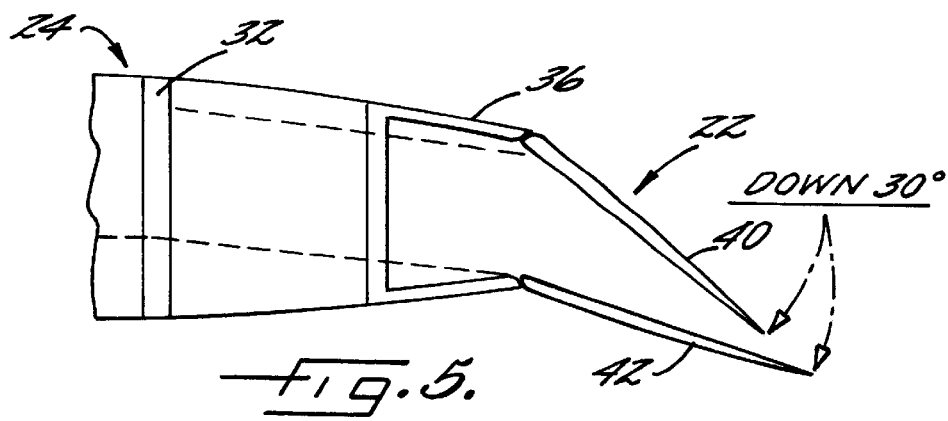
Fig. 5.
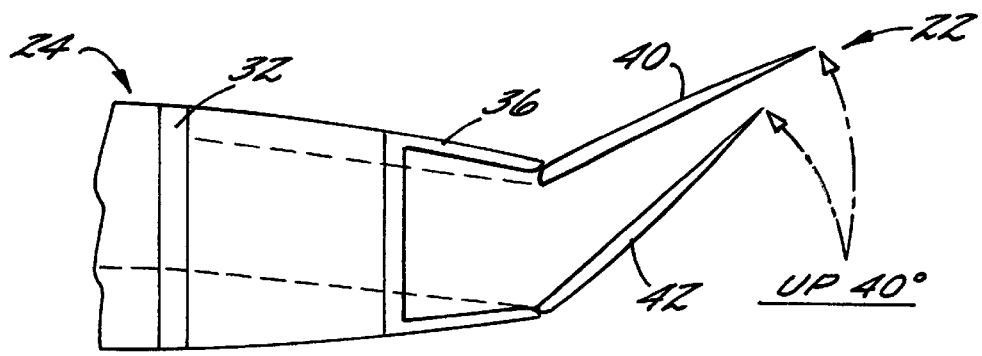
Fig. 6.
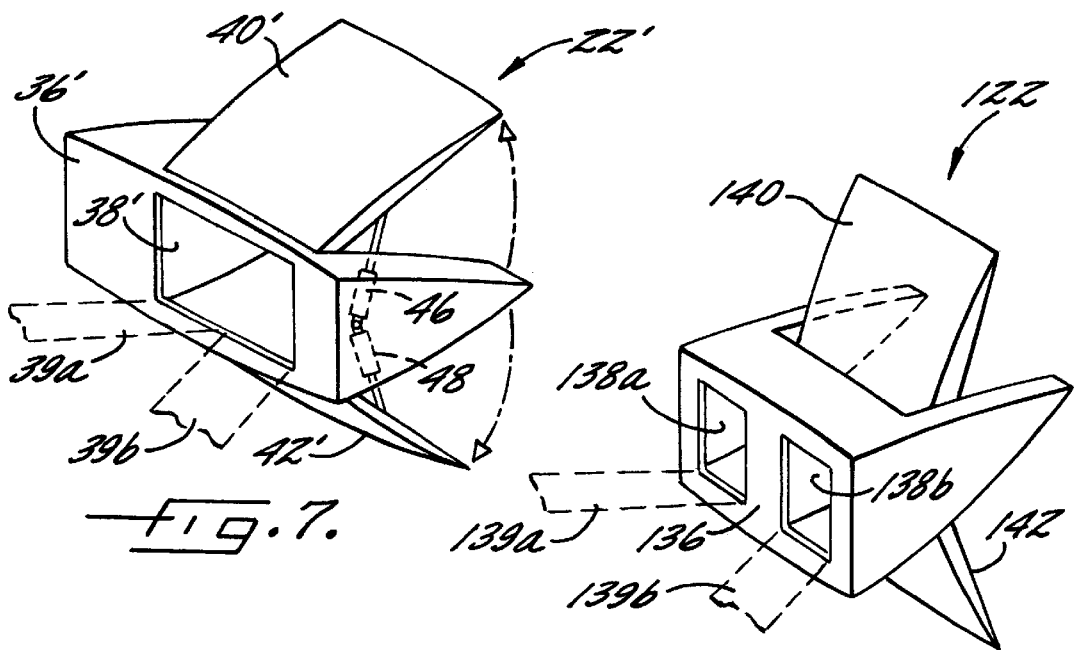
Fig. 7.
Fig. 8.

AFT EGRESS AND CONTROL DEVICE FOR AN AIRCRAFT

FIELD OF THE INVENTION

The present invention relates to aircraft of the type having a cabin defined within a wing of the aircraft. More particularly, the invention relates to an aft egress device providing access to the cabin of such an aircraft and to an aircraft having such an aft egress device.

BACKGROUND OF THE INVENTION

The economics of commercial air transport for passengers and/or cargo in many cases favor larger-capacity aircraft. Accordingly, aircraft designs are being contemplated which would enable capacity to be increased substantially above the largest aircraft that are currently available. Among the aircraft configurations being studied are aircraft having the passenger cabin and/or cargo compartments within the wing rather than (or in addition to) within the fuselage. Such aircraft are referred to herein as "blended wing-body" aircraft, but it will be understood that the invention is not limited to any particular aircraft configuration and applies to any aircraft having a cabin or compartment within a wing.

Conventional aircraft having the cabin in the fuselage typically have lateral doors for entering and exiting the cabin through the sides of the fuselage. In blended wing-body aircraft, however, it is not practical to employ lateral doors, because in many of these aircraft the inboard portions of the wing are used for passenger cabins while the outboard portions of the wing are devoted to fuel storage and/or cargo holds which prevent lateral access to the cabins. Accordingly, the primary access doors to the cabins in many blended wing-body aircraft currently being considered are in the leading edge of the wing. This area is removed from most of the major systems (engines, controls, hydraulic systems, etc.) of the aircraft so that access doors do not conflict with such systems. However, in order to meet regulations requiring complete evacuation of the aircraft within a given time period, it is necessary in some cases to have additional exits beyond those in the leading edge area of the aircraft wing.

Emergency evacuation requirements impose additional constraints on the design of all aircraft including blended wing-body type aircraft. The exit paths must not be too steep either ascending or descending. For the consideration of a water landing, the exits should be above the water line. The exit opening should have sufficient cross section to accommodate the required flow rate of passengers. The exits also should function when the aircraft is on any combination of gear struts when one or more of the struts fail or fail to extend. Such requirements in some cases may rule out some locations which might be considered candidates for additional exits from the cabin of a blended wing-body aircraft. For instance, the requirement that the egress still function in a water landing and when the aircraft is on its belly (i.e., all landing gear up) may rule out locating the egress in the wing lower surface.

Additionally, in the case of commercial passenger aircraft, it is desirable to be able to service the aircraft (e.g., clean the cabin, remove used food carts and replace with new ones, etc.) as quickly as possible in order to keep ground time to a minimum. Since primary access to the cabins for the passengers is through the wing leading edge, the forward areas of the cabins can become congested during deplaning and boarding, so that cabin servicing may need to be completed before passenger loading can begin. This can cause a significant delay. Thus, it would be desirable to provide additional access openings to the cabin area enabling service crews to service the cabin simultaneous with passenger boarding. However, the possible locations of such access openings are limited by the aforementioned considerations.

SUMMARY OF THE INVENTION

The above needs are met and other objects and advantages are achieved by the present invention, which provides an aircraft having an aft egress device which provides access to the cabin through a trailing edge portion of the wing. Although the trailing edge of the wing is usually devoted to variable control surfaces such as pitch controllers, and may also accommodate engines, hydraulic systems, and other systems, the invention nevertheless enables an aft egress to be located in the trailing edge of the wing. To this end, in preferred embodiments of the invention, the aft egress device performs dual functions of providing access to the cabin and serving as a variable control surface for the aircraft.

In one preferred embodiment of the invention, the aircraft comprises a wing having upper and lower aerodynamic surfaces extending between a leading edge and a trailing edge of the wing, and a cabin defined in an interior of the wing and having an aft end extending proximate the trailing edge of the wing. The cabin has an opening in the aft end thereof for entry to and exit from the cabin. The aircraft further includes a wedge-shaped trailing edge portion of the wing which is juxtaposed with the opening in the cabin, the trailing edge portion having an open interior and including a panel which is pivotable into an open position so as to define a door or passage in the trailing edge portion through which the opening in the cabin is accessible. The trailing edge portion of the wing thus serves as an aft egress device for access to and egress from the cabin.

Preferably, the trailing edge portion of the wing is formed by upper and lower panels which converge toward their aft edges. In one embodiment, the upper panel which forms an upper surface of the trailing edge portion is pivotable about a forward end thereof so as to perform dual functions of acting as a door which is opened to provide access to the cabin and serving as a control surface for the aircraft when suitably controlled by an actuator. Instead of or in addition to the pivotable upper panel, the lower panel which forms a lower surface of the trailing edge portion may be pivotable about a forward end of the lower panel so as to extend down from the wing. The lower panel may thus serve as an aerodynamic control surface and/or as an emergency slide for evacuation of the cabin. In some preferred embodiments, the upper and lower panels are pivotable in unison so that the entire trailing edge portion of the wing forms a variable control surface. Additionally, in other preferred embodiments, the upper and lower panels may be independently actuated during flight. For example, the panels may split apart for reasons such as aerodynamic braking on a landing roll.

The lower panel preferably is pivotable into a generally horizontal position so as to serve as a ramp for loading and unloading passengers, crew members, and/or cargo into and out of the cabin.

In another preferred embodiment of the invention, the wedge-shaped trailing edge portion is formed by an upper panel and a lower panel each having a forward end and an aft end, one of the upper and lower panels being pivotally connected at the forward end thereof to the wing and the other panel being pivotally connected at the forward end thereof to the one panel. The aft egress device further comprises a latch which releasably secures the upper panel to the lower panel such that pivotal movement of one panel causes the other panel to pivot in unison therewith. An actuator engages the one panel and operates to pivot the one panel, whereby the trailing edge portion of the wing is pivotable. The aft egress device advantageously includes a spring which biases the upper and lower panels pivotally away from each other such that upon release of the latch the panels are pivotally moved apart so that at least one of the panels assumes an open position creating the passage for entry and exit through the access opening between the panels.

It will thus be appreciated that the invention meets the aforementioned needs by providing an aircraft having one or more aft egress devices which can serve as additional exits for emergency evacuation of the aircraft, and can also serve as access passages for service crews to service the aircraft from the rear, thus allowing passengers to board the aircraft through forward doors while service crew members simultaneously service the aircraft. At the same time, where the aft egress device also serves as a variable control surface, the invention enables aft access passages to be provided without conflicting with the requirement of providing control surfaces for the aircraft.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 5 is a view similar to FIG. 2, showing the aft egress device in a flap-down control position;

FIG. 6 is a view similar to FIG. 2, showing the aft egress device in a flap-up control position;

FIG. 7 is a perspective view of an aft egress device in accordance with a preferred embodiment of the invention, in which a single double-wide access opening extends through the auxiliary spar for exit through the egress device, and showing the upper and lower panels pivoted away from each other for aerodynamic control purposes;

FIG. 8 is a view similar to FIG. 7, showing an alternative embodiment of the invention in which the aft egress device has a pair of single-wide access openings extending through the auxiliary spar for exit through the egress device;

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
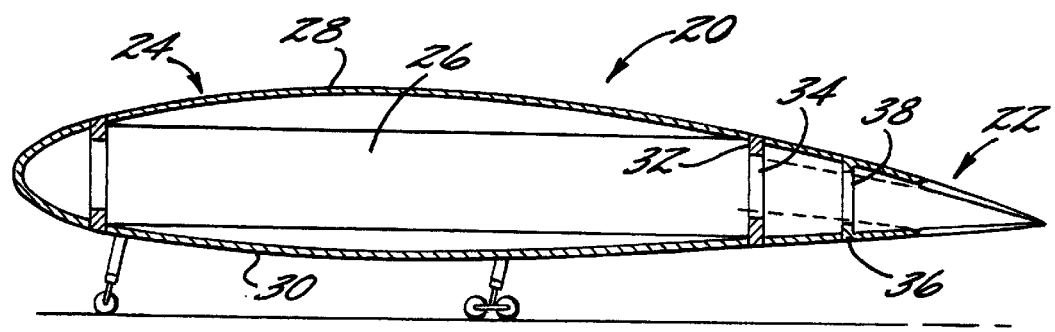
FIG. 1 is a sectioned side elevation of an aircraft having an aft egress device in accordance with one preferred embodiment of the invention.

With reference to FIG. 1, an aircraft 20 is schematically shown in sectioned side elevation in which an aft egress device 22 in accordance with one embodiment of the invention forms a wedge-shaped trailing edge portion of the wing 24. The aircraft 20 is of the blended wing-body (also known as "flying wing") type of aircraft in which a cabin 26 is defined within the interior of the wing between the upper surface 28 and the lower surface 30 of the wing. The aft end of the cabin 26 is bounded by a rear spar 32 which includes an access opening 34 through which access can be had to the cabin. The aircraft also includes an auxiliary spar 36 aft of the rear spar 32, the auxiliary spar serving as a support structure for the aft egress device 22. The auxiliary spar 36 also includes an access opening 38 for access to the cabin, as further described below.

Figure 2:
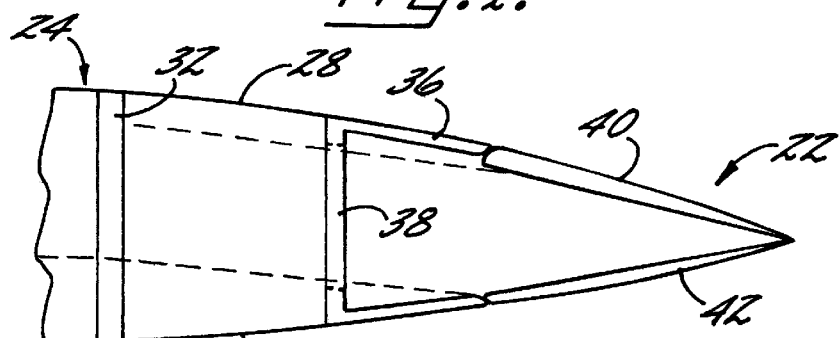
FIG. 2 is an enlarged sectioned side elevation of the trailing edge portion of the aircraft, showing the aft egress device in a closed position.

FIGS. 2–6 depict the aft egress device 22 in more detail and illustrate the device in various positions. As shown in FIG. 2, the aft egress device 22 includes an upper panel 40 which is pivotally mounted at its forward end to the auxiliary spar 36, such as by means of a hinged connection, and a lower panel 42 which likewise is pivotally mounted at its forward end to the auxiliary spar, also typically by means of a hinged connection. The forward ends of the panels 40 and 42 are vertically spaced apart and are generally aligned with the upper and lower ends of the access opening 38 in the auxiliary spar 36. FIG. 2 depicts the aft egress device in a closed condition in which the upper and lower panels 40 and 42 converge toward their aft ends to form a wedge-shaped trailing edge portion of the wing 24. The upper panel 40 forms an extension of the upper surface 28 of the wing, and the lower panel 42 forms an extension of the lower surface 30 of the wing. The panels 40 and 42 close the access opening 38 when they are in the closed positions as shown in FIG. 2.

Figure 3:
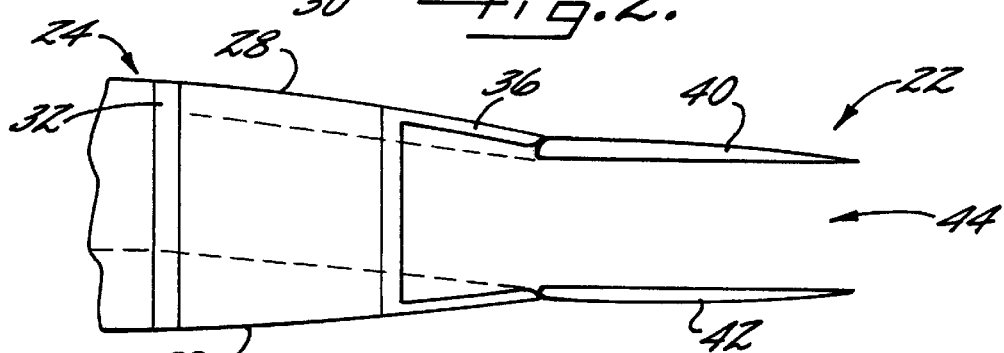
FIG. 3 is a view similar to FIG. 2, showing the aft egress device in an open service position for loading and unloading persons and cargo into and out of the cabin using the lower panel as a ramp.
Figure 9:
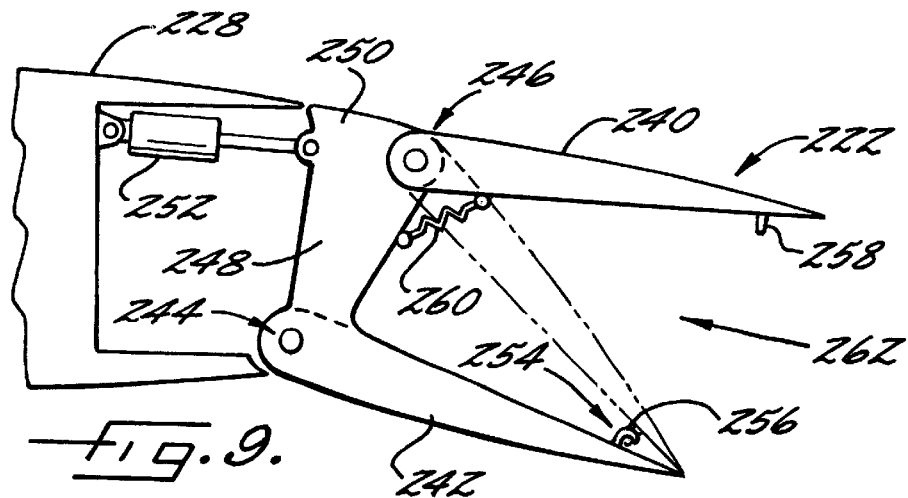
FIG. 9 is a side elevation of another preferred embodiment of the invention, showing an aft egress device having the upper panel slaved to the lower panel by a latch such that pivotal movement of the lower panel causes the upper panel to pivot in unison therewith, and showing the upper panel pivotally urged away from the lower panel by a spring when the latch is disengaged.
Figure 10:
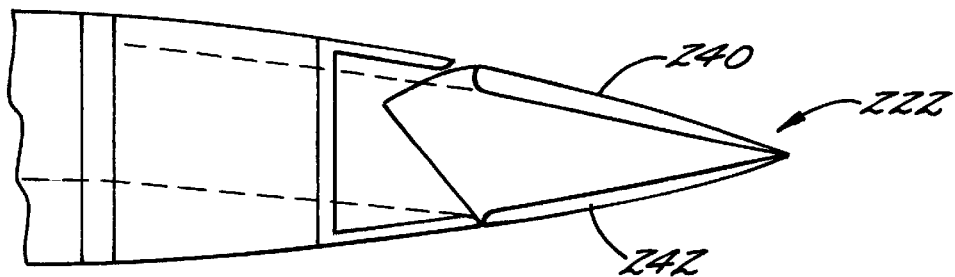
FIG. 10 is a view of the embodiment shown in FIG. 9, showing the aft egress device in a closed position analogous to FIG. 2.

FIG. 3 shows the aft egress device 22 in an open service position enabling service crew members to enter through the access opening 38 and through the opening 34 in the rear spar 32 into the cabin 26 (FIG. 1). The upper panel 40 is pivoted upward and the lower panel 42 is pivoted downward into a generally horizontal position. Typically, the upper and/or lower panels are pivoted by means of actuators or the like, as described below in conjunction with the embodiment of FIG. 9. The lower panel 42 in this position serves as a ramp for loading and unloading persons and cargo into and out of the cabin. Thus, a passage 44 is created between the panels 40 and 42 for access to the cabin.

Figure 4:
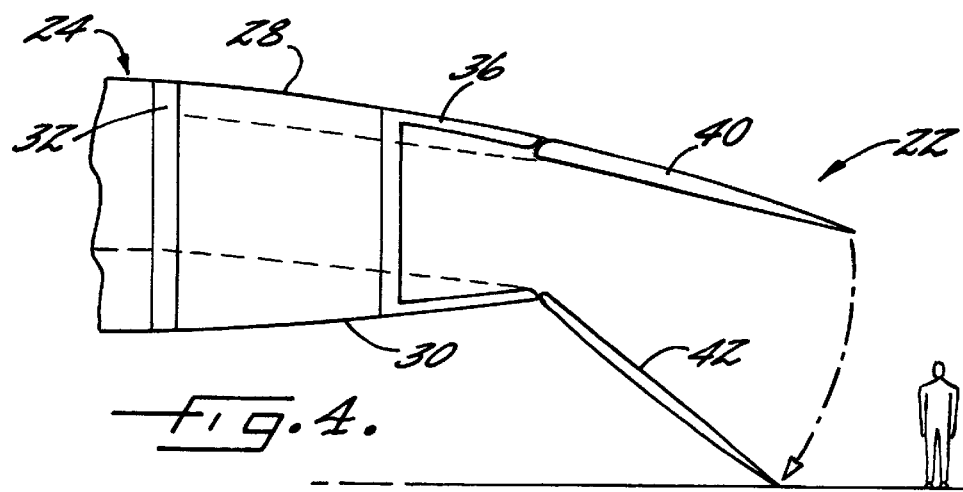
FIG. 4 is a view similar to FIG. 2, showing the aft egress device in an open emergency exit position with the lower panel pivoted downward to serve as an emergency slide.

FIG. 4 shows the aft egress device 22 in an open emergency evacuation position enabling persons in the cabin to exit the aircraft through the egress device and reach the ground. The lower panel 42 is pivoted downward so as to extend down from the wing 24 to the ground (or the water in the case of a water landing). In this position, the lower panel 42 serves as an emergency slide.

The invention enables the aft egress device 22 to perform dual functions of providing an access passage for access to and evacuation of the cabin, and also providing aerodynamic control to the aircraft. FIG. 5 shows the aft egress device 22 in a flap-down configuration for providing aerodynamic control to the aircraft. The upper panel 40 and lower panel 42 are pivoted generally in unison so as to angle downward. Similarly, FIG. 6 shows the aft egress device 22 in a flap-up configuration with the panels 40 and 42 pivoted generally in unison so as to angle upward.

Various configurations of an aft egress device are possible within the scope of the invention. FIGS. 7 and 8 are perspective views of two alternative embodiments of aft egress devices in accordance with the invention. In FIG. 7, an aft egress device 22' is shown in which a single double-wide access opening 38' is formed in an auxiliary spar 36' so that two side-by-side aisles 39*a* and 39*b* leading from the cabin of the aircraft can feed into the egress device. For example, in the case of a two-level cabin having upper and lower decks, one of the aisles 39*a* may lead from the upper deck while the other aisle 39*b* leads from the lower deck. Pivotal movement of the upper panel 40' is effected by an actuator 46 connected at one end to the fixed wing structure and connected at the other end to the upper panel 40'. Pivotal movement of the lower panel 42' is effected by a separate actuator 48 similarly connected between the wing structure and the lower panel. Thus, the upper and lower panels may be moved independently of each other. For example, the upper and lower panels 40' and 42' may be pivoted away from each other as shown for aerodynamic control purposes such as aerodynamic braking on a landing roll.

FIG. 8 shows an alternative embodiment of an aft egress device 122 in which two side-by-side single-wide access openings 138*a* and 138*b* are formed in the auxiliary spar 136 so that two aisles 139*a* and 139*b* leading from the aircraft cabin can be fed to the egress device. FIG. 8 also illustrates that in some cases it is desirable to provide the upper panel 140 and lower panel 142 with the capability of rotating to generally vertical positions (or more preferably past vertical) so as not to interfere with ground service vehicles which may dock with the passage in the aft egress device 122.

The aft egress devices 22, 22', and 122 which have been described thus far have independently controllable upper and lower panels. However, the invention also encompasses aft egress devices in which one of the panels is slaved to the other so that the panels pivot in unison during active control of the position of the aft egress device. FIGS. 9–14 depict an aft egress device 222 in which the lower panel 242 is pivotally connected at its forward end 244 to the wing structure, and the upper panel 240 is pivotally connected at its forward end 246 to the lower panel 242 via a pair of side walls 248 which are fixed to the lower panel 242 along each of the opposite sides thereof. The side walls 248 extend upward from the lower panel 242 and terminate at upper ends 250 adjacent the upper surface 228 of the wing. The upper panel 240 is pivotally connected to the upper ends 250 of the side walls 248. An actuator 252 is connected between the wing structure and each of the side walls 248 for effecting pivotal movement of the lower panel 242. The aft egress device 222 includes a latch 254 comprising cooperative latch members 256 and 258 attached to the lower panel 242 and upper panel 240, respectively. When the latch members 256 and 258 are engaged with each other, the upper panel 240 is slaved to the lower panel 242 (as shown in phantom lines in FIG. 9) so that pivotal movement of the lower panel also causes the upper panel to pivotally move in unison with the lower panel. The aft egress device 222 also includes a spring device 260 connected between the lower panel 242 and the upper panel 240 for biasing the panels away from each other. When the latch members 256 and 258 are disengaged from each other, the spring device 260 pivotally moves the upper panel 240 upward away from the lower panel 242 so as to create a passage 262 between the panels for access to the cabin of the aircraft. Although the spring device 260 is illustrated as being a coil spring, it will be understood that other types of spring devices such as pneumatic devices or the like may be used instead of or in addition to a coil spring.

Figure 11:
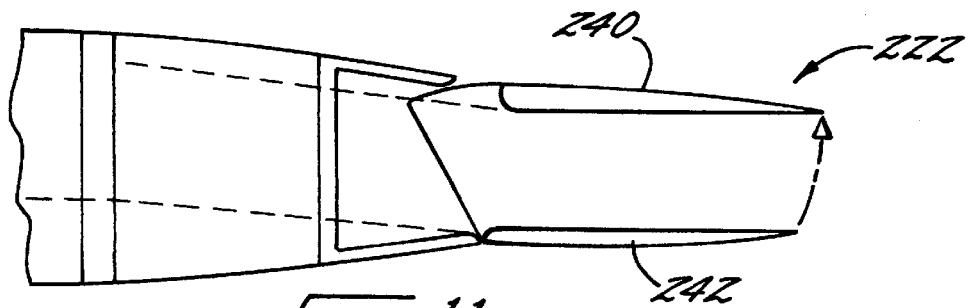
FIG. 11 is a view of the embodiment shown in FIG. 9, showing the aft egress device in an open service position analogous to FIG. 3.
Figure 12:
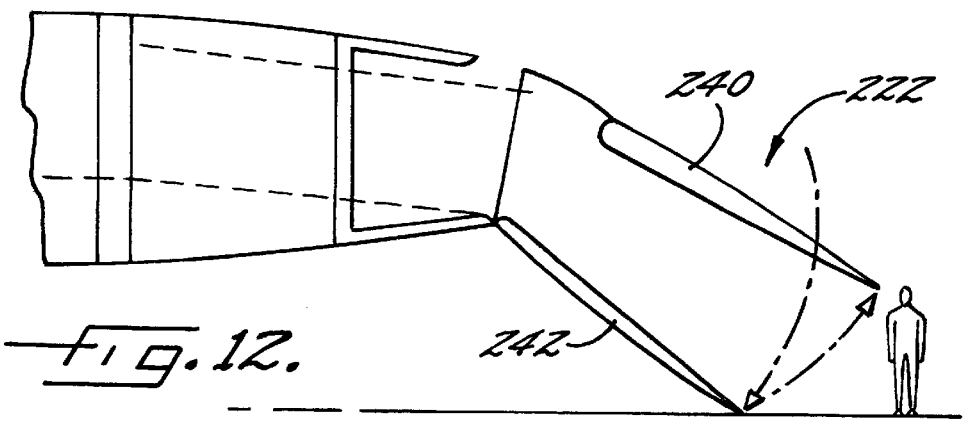
FIG. 12 is a view of the embodiment shown in FIG. 9, showing the aft egress device in an open emergency position analogous to FIG. 4.
Figure 13:
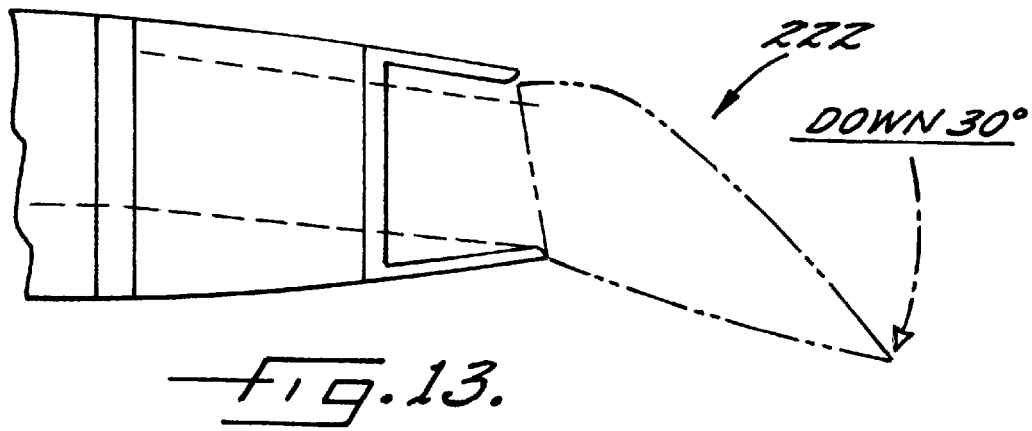
FIG. 13 is a view of the embodiment shown in FIG. 9, showing the aft egress device in a flap-down position analogous to FIG. 5.
Figure 14:
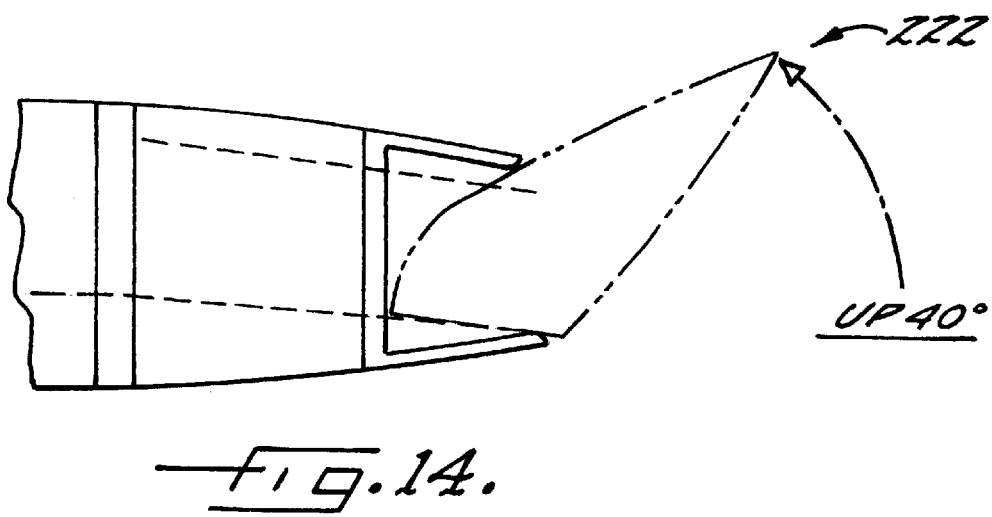
FIG. 14 is a view of the embodiment shown in FIG. 9, showing the aft egress device in a flap-up position analogous to FIG. 6.

FIGS. 10–14 depict the aft egress device 222 in various positions corresponding to the positions of the aft egress device 22 shown in FIGS. 2–6, respectively. To configure the aft egress device 222 for access to the cabin by a ground service crew, the upper panel 240 is unlatched from the lower panel 242 and the lower panel 242 is pivoted into a generally horizontal position, as shown in FIG. 11, so that the lower panel serves as a ramp for loading and unloading. For emergency evacuation of the cabin, the panels are unlatched from each other and the lower panel 242 is pivoted downward to intersect the ground (or the water in the case of a water landing) so as to serve as an emergency slide, as shown in FIG. 12. FIGS. 13 and 14 show the aft egress device 222 in flap-down and flap-up positions for effecting aerodynamic control of the aircraft.

From the foregoing description of certain preferred embodiments of the invention, it will be appreciated that the invention provides unique aft egress devices enabling access to and egress from a cabin in an aircraft wing through an aft end of the cabin and through a trailing edge portion of the wing. Locating the egress device at the wing trailing edge enables the device to be used for emergency evacuation in a variety of circumstances including water landings, belly landings (i.e., all landing gear up), and various combinations of landing gear failures. The aft egress devices of the invention can also serve as access passages for service crews to service the aircraft from the rear, thus allowing passengers to board the aircraft through forward doors while service crew members simultaneously service the aircraft from the rear. Additionally, where the aft egress devices also serve as variable control surfaces, the invention enables aft access passages to be provided without conflicting with the requirement of providing trailing edge control surfaces for the aircraft.

Many modifications and other embodiments of the invention will come to mind to one skilled in the art to which this invention pertains having the benefit of the teachings presented in the foregoing descriptions and the associated drawings. For example, the aft egress device 222 is illustrated and described as having the lower panel 242 connected to the actuators 252 and the upper panel 240 slaved to the lower panel 242; however, it will be recognized that the upper panel 240 may be connected to the actuators 252 and the lower panel 242 may be slaved to the upper panel. Furthermore, the described embodiments have both the upper and lower panels pivotable, but in some cases it may be desirable to have one of the panels fixed and the other pivotable. Additionally, while the upper and lower panels are described as being pivotally mounted to auxiliary spar 36, the upper and lower panels can be mounted to other portions of the wing such that the resulting aft egress device forms a portion of the trailing edge of the wing. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An aircraft, comprising:
   a wing having upper and lower aerodynamic surfaces extending between a leading edge and a trailing edge of the wing;
   a cabin defined between the upper and lower surfaces of the wing and having an aft end proximate the trailing edge of the wing, the cabin defining an opening in the aft end thereof for entry to and exit from the cabin; and
   a generally wedge-shaped aft egress and control device forming at least a portion of the trailing edge of the wing and being pivotable as a unit relative to the remainder of the wing so as to serve as a trailing-edge control surface of the wing, the aft egress and control device comprising upper and lower panels and an actuator system connected to the panels and operable to pivot the panels in both same and opposite directions to each other, the actuator system being operable to pivot at least one of the panels away from the other so as to create a passage therebetween connected to the opening in the cabin, whereby access can be had to the cabin through the aft egress and control device.

2. The aircraft of claim 1, wherein both of the upper and lower panels are mounted on the wing.

3. The aircraft of claim 1, wherein one of the panels is mounted on the wing and the other panel is mounted on the one panel.

4. The aircraft of claim 3, wherein the actuator system comprises a first actuator connected to the one panel for pivoting the aft egress and control device as a unit when used as a control surface, and a second actuator connected between the panels for pivoting the panels away from each other to gain access to the cabin.

5. The aircraft of claim 4, wherein the second actuator comprises a spring.

6. The aircraft of claim 5, further comprising a latch operable to latch the panels together when the aft egress and control device is used as a control surface and to unlatch to allow the panels to pivot relatively away from each other to gain access to the cabin.

7. The aircraft of claim 1, wherein the panels are pivotable away from each other into substantially vertical orientations so as not to interfere with ground vehicles docking with the passage in the aft egress and control device.

8. The aircraft of claim 1, wherein the lower panel is pivotable down away from the upper panel into an inclined orientation so as to serve as a ramp.

9. The aircraft of claim 1, wherein the panels are pivotally mounted on a spar of the wing.

10. The aircraft of claim 9, wherein the aft end of the cabin is bounded by a rear spar of the wing, and the spar on which the panels are mounted comprises an auxiliary spar located aft of the rear spar.

11. The aircraft of claim 10, wherein the opening into the cabin is defined in the rear spar, and the auxiliary spar also defines an opening therethrough for access to the cabin.

12. The aircraft of claim 1, wherein the aft egress and control device is pivotable into flap-up and flap-down positions.

13. The aircraft of claim 1, wherein the cabin has two aisles located side-by-side leading into the opening at the aft end of the cabin, and the passage through the aft egress and control device is a double-wide passage connecting to both aisles.

14. The aircraft of claim 13, wherein the panels are pivotally mounted on an auxiliary spar of the wing and the passage through the aft egress and control device connects to a double-wide opening in the auxiliary spar aligned with the two aisles of the cabin.

15. The aircraft of claim 13, wherein the panels are pivotally mounted on an auxiliary spar of the wing and the passage through the aft egress and control device connects to a pair of side-by-side openings in the auxiliary spar respectively aligned with the two aisles of the cabin.

16. The aircraft of claim 1, wherein the actuator system comprises independently operable actuators connected to the upper and lower panels for pivoting each panel independently of the other.

* * * * *